US011232258B2

(12) United States Patent
Andrews et al.

(10) Patent No.: US 11,232,258 B2
(45) Date of Patent: Jan. 25, 2022

(54) NATURAL LANGUAGE PROCESSING OF UNSTRUCTURED DATA

(71) Applicant: Promontory Financial Group, LLC, Washington, DC (US)

(72) Inventors: Joshua N Andrews, Centennial, CO (US); Thomas C Wisehart, Jr., Centennial, CO (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 661 days.

(21) Appl. No.: 15/689,134

(22) Filed: Aug. 29, 2017

(65) Prior Publication Data
US 2019/0065461 A1 Feb. 28, 2019

(51) Int. Cl.
*G06F 40/216* (2020.01)
*G06F 16/36* (2019.01)
*G06F 16/35* (2019.01)
*G06F 16/33* (2019.01)
*G06F 40/30* (2020.01)
*G06F 40/289* (2020.01)

(52) U.S. Cl.
CPC ........ *G06F 40/216* (2020.01); *G06F 16/3344* (2019.01); *G06F 16/355* (2019.01); *G06F 16/36* (2019.01); *G06F 40/289* (2020.01); *G06F 40/30* (2020.01)

(58) Field of Classification Search
USPC .................................................... 704/1–504
See application file for complete search history.

(56) References Cited

U.S. PATENT DOCUMENTS

| | | | | |
|---|---|---|---|---|
| 6,550,057 | B1* | 4/2003 | Bowman-Amuah | ... H04L 67/42 717/126 |
| 6,571,282 | B1* | 5/2003 | Bowman-Amuah | ........... H04L 67/303 709/219 |
| 7,657,424 | B2* | 2/2010 | Bennett | ........... G06F 40/30 704/9 |
| 7,912,702 | B2* | 3/2011 | Bennett | ........... G06F 16/3344 704/9 |
| 8,762,152 | B2* | 6/2014 | Bennett | ........... G10L 15/183 704/257 |
| 10,075,384 | B2* | 9/2018 | Shear | ........... H04L 47/70 |
| 10,102,192 | B2* | 10/2018 | Upadhyay | ........... H04L 51/22 |
| 2005/0086049 | A1* | 4/2005 | Bennett | ........... G06F 40/42 704/4 |

(Continued)

FOREIGN PATENT DOCUMENTS

WO 2016175791 A1 11/2016

*Primary Examiner* — Marcus T Riley
(74) *Attorney, Agent, or Firm* — Cuenot, Forsythe & Kim, LLC

(57) ABSTRACT

A computer system for processing unstructured data, the computer system comprising a computer processor, a computer memory operatively coupled to the computer processor and the computer memory having disposed within it computer program instructions that, when executed by the processor, cause the computer system to carry out the steps of receiving unstructured data input from a client device, analyzing the unstructured data for features that satisfy logical segment criteria by using natural language processing (NLP), and partitioning the unstructured data into logical segments based on satisfaction of the logical segment criteria.

8 Claims, 6 Drawing Sheets

(56) References Cited

U.S. PATENT DOCUMENTS

| | | | |
|---|---|---|---|
| 2005/0086059 A1* | 4/2005 | Bennett | G10L 15/18 704/270 |
| 2005/0119897 A1* | 6/2005 | Bennett | G10L 15/30 704/270.1 |
| 2007/0094032 A1* | 4/2007 | Bennett | G10L 15/22 704/270.1 |
| 2010/0228540 A1* | 9/2010 | Bennett | G09B 5/04 704/9 |
| 2010/0235341 A1* | 9/2010 | Bennett | G10L 15/18 707/706 |
| 2016/0196515 A1 | 7/2016 | Adler | |
| 2016/0294614 A1* | 10/2016 | Searle | H04L 67/34 |
| 2016/0350885 A1 | 12/2016 | Clark | |
| 2016/0364377 A1* | 12/2016 | Krishnamurthy | G06F 40/30 |

* cited by examiner

NATURAL LANGUAGE PROCESSING OF UNSTRUCTURED DATA

BACKGROUND

The present invention generally relates to data processing, and in particular, natural language processing of unstructured data.

Natural language processing ("NLP") is a field of computer science, artificial intelligence, and linguistics concerned with the interactions between computers and human (natural) languages. Many challenges in NLP involve natural language understanding, e.g., enabling computers to derive meaning from human or natural language input. Understanding human language includes understanding not only the words, but also the concepts and how they are organized. For example, unstructured data comprising a large body of text commonly include various logical sections.

SUMMARY

A method, computer systems, and computer program products are disclosed. According to one embodiment, said method is for processing unstructured data in a data processing system comprising a processor and a memory. Said method comprises receiving, by said data processing system, unstructured data input from a client device. Said unstructured data is analyzed, by said data processing system, for features that satisfy logical segment criteria by using natural language processing (NLP). Said method further comprises partitioning, by said data processing system, said unstructured data into logical segments based on satisfaction of said logical segment criteria.

Said unstructured data may comprise text including a variety of topics or content. Analyzing said unstructured data for features may further comprise using said NLP to identify text that satisfy said logical segment criteria. In one embodiment, said unstructured data may include compliance obligations. Said logical segment criteria may include features associated with a plurality of industries or companies. Said logical segment criteria may also include features associated with importance, priority, or risk.

According to another embodiment, a computer system comprises a computer processor, a computer memory operatively coupled to said computer processor and said computer memory having disposed within it computer program instructions that, when executed by said processor, cause said computer system to carry out said steps of receiving unstructured data input from a client device, analyzing said unstructured data for features that satisfy logical segment criteria by using natural language processing (NLP), partitioning said unstructured data into logical segments based on satisfaction of said logical segment criteria, and incorporating said logical segments into a repository.

Said computer system may further comprise said processor linking one or more files from said repository to said logical segments. In another embodiment, said computer system further comprises said processor generating files, documents, records, or data entries using said logical segments. Said logical segments may comprise one or more pointers, references, linked lists, or data structures.

According to another embodiment, a computer system comprises a computer processor, a computer memory operatively coupled to said computer processor and said computer memory having disposed within it computer program instructions that, when executed by said processor, cause said computer system to carry out said steps of receiving unstructured data from a user input. Said unstructured data is decomposed into text fragments. Logical segment evaluation criteria are received from said user input. Features of said text fragments are identified. A score is assigned to said text fragments for one or more logical segments.

Decomposing said unstructured data into text fragments may further comprise grouping text fragments based on logical operators, formatting codes, and punctuation. Said computer system may further comprise comparing said unstructured data to said logical segment evaluation criteria. Said logical segment evaluation criteria may define how said unstructured data is divided into logical segments. Said logical segments may represent topics, topic types, target audiences, and degrees of importance. Identifying features of said text fragments may further comprise using NLP to determine that said text fragments satisfy said logical segment evaluation criteria. Assigning said score to said text fragments may further comprise evaluating said text fragments in accordance to said logical segment evaluation criteria. Said score may comprise a value that indicates a degree to which said text matches a logical segment based on said logical segment evaluation criteria.

In one embodiment, a computer program product comprises a computer readable storage medium having stored thereon program instructions executable by a computer to cause said computer to receive unstructured data input from a client device. Said computer program product also comprises program instructions executable by said computer to cause said computer to analyze said unstructured data for features that satisfy logical segment criteria by using natural language processing (NLP). Said computer program product further comprises program instructions executable by said computer to cause said computer to partition said unstructured data into logical segments based on satisfaction of said logical segment criteria.

Said unstructured data may comprise text including a variety of topics or content. Said computer program product may further comprise program instructions executable by said computer to cause said computer to use said NLP to identify text that satisfy said logical segment criteria. Said unstructured data may include compliance obligations. Said logical segment criteria can include features associated with a plurality of industries or companies. Said logical segment criteria may also include features associated with importance, priority, or risk.

In one embodiment, a computer program product comprises a computer readable storage medium having stored thereon program instructions executable by a computer to cause said device to receive unstructured data input from a client device. Said computer program product further comprises program instructions executable by said computer to cause said computer to analyze said unstructured data for features that satisfy logical segment criteria by using natural language processing (NLP). Said computer program product comprises program instructions executable by said computer to cause said computer to partition said unstructured data into logical segments based on satisfaction of said logical segment criteria. Said computer program product also comprises fourth program instructions executable by said computer to cause said computer to incorporate said logical segments into a repository.

DETAILED DESCRIPTION

Figure 1:
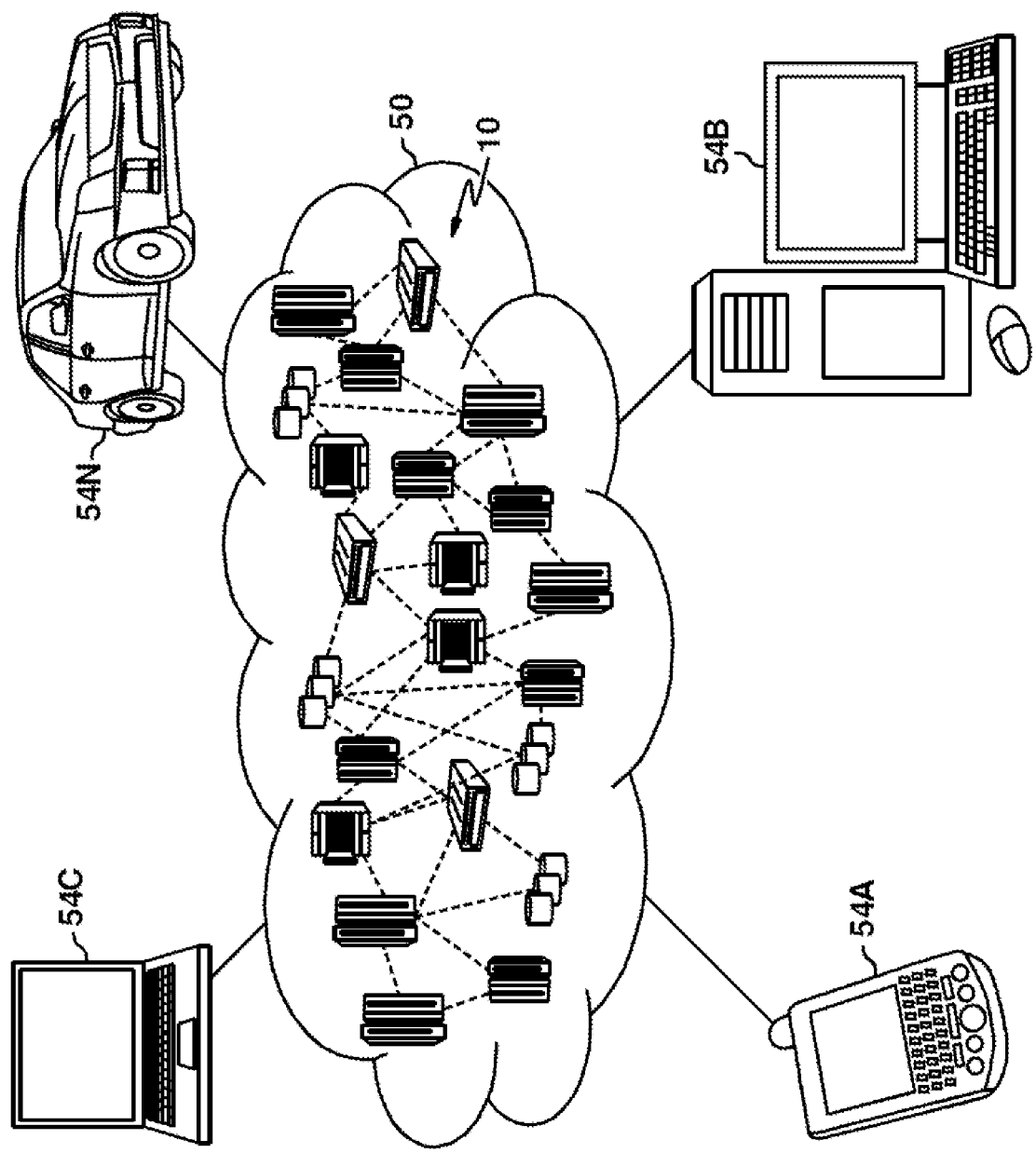
FIG. 1 depicts a cloud computing environment according to an embodiment of the present invention.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Exemplary methods, computer systems, and products for natural language processing ("NLP") in accordance with the present invention are described with reference to the accompanying drawings. NLP can be used to analyze text in combination with machine-learning to facilitate understanding of human languages by a computer. Computers may utilize NLP in a variety of real-world applications, such as, machine translation, information extraction, automatic text summarization, sentiment analysis, word filtering, automated question answering, etc. According to embodiments of the present invention, NLP may be used to extract and separate information pertaining to a variety of topics, genres, or subject matter from unstructured data into logical segments. Information in the logical segments may then be added into or mapped to corresponding documents of a corpus or database. Unstructured data may include information that either does not have a pre-defined data model or is not organized in a pre-defined manner and is typically text-heavy, but may contain data such as dates, numbers, and facts. Irregularities and ambiguities in unstructured data make it difficult to process as compared to organized data such as fielded data stored in databases or data that has been annotated (semantically tagged) such as in documents.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
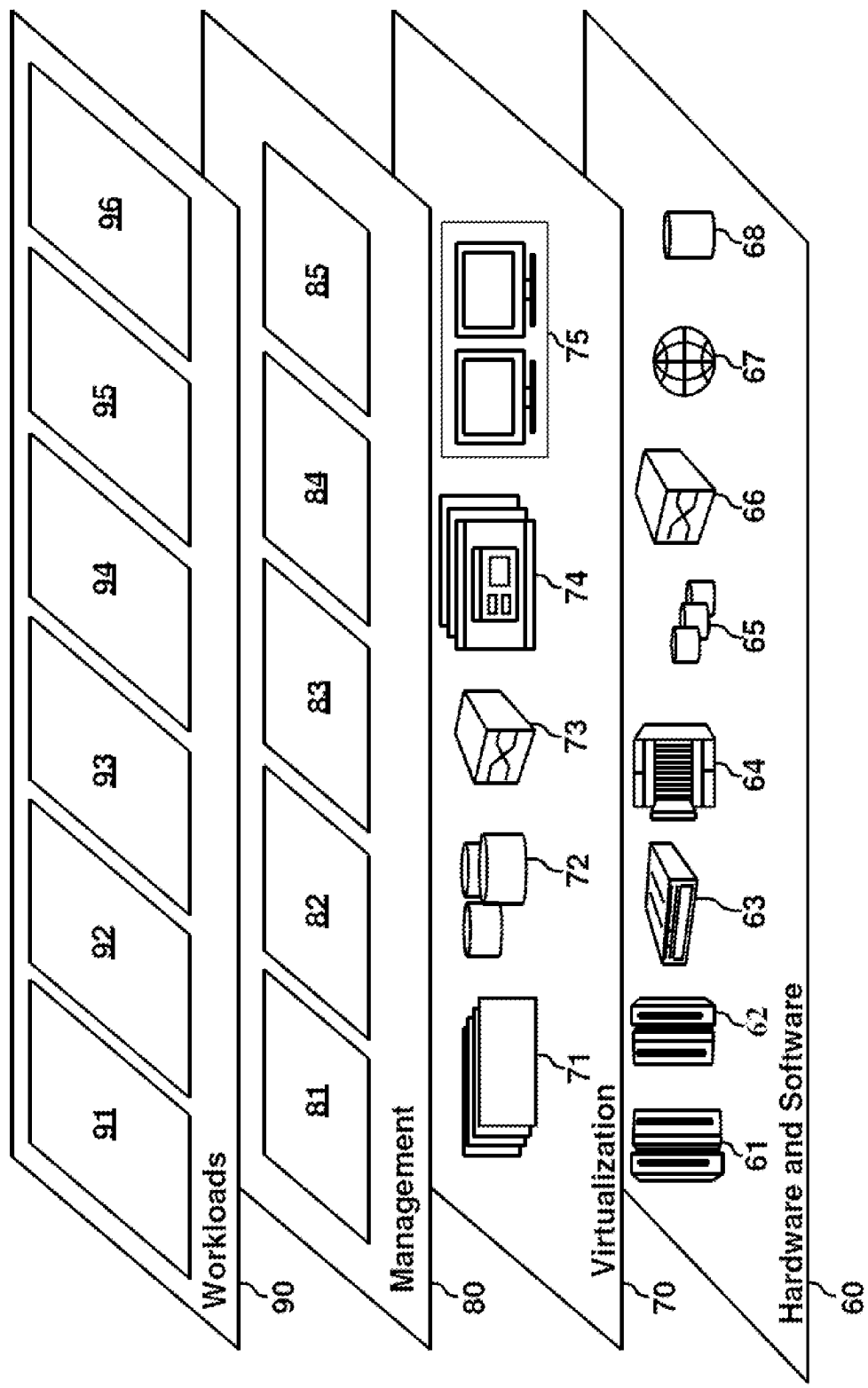
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and unstructured data processing 96.

Figure 3:
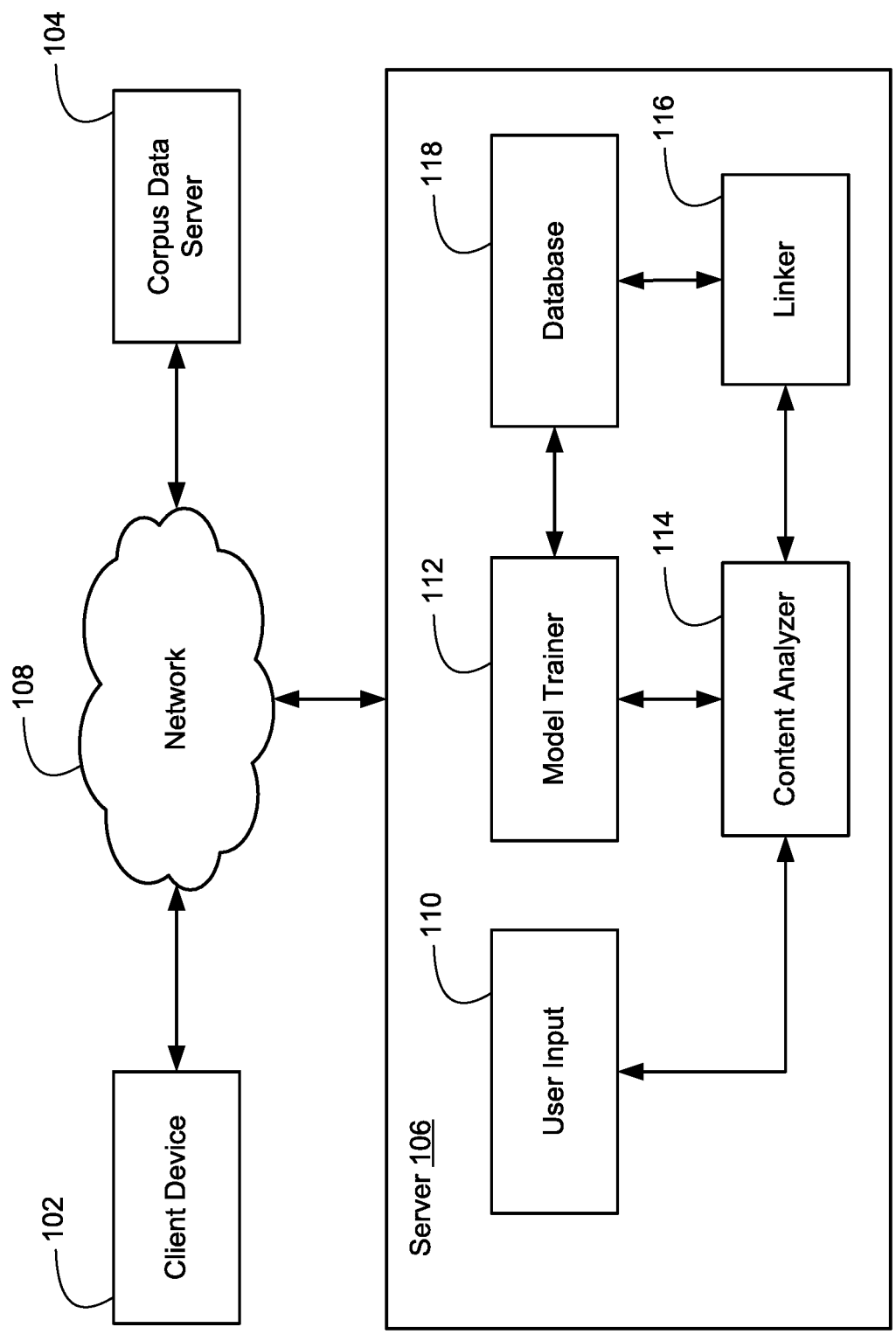
FIG. 3 depicts a logical block diagram of a system for natural language processing of unstructured data according to one embodiment of the present invention.

FIG. 3 presents a logical block diagram of a system for natural language processing of unstructured data according to one embodiment of the present invention. The present invention is not limited to the arrangement of servers and other devices in the exemplary system illustrated in FIG. 3, but rather are for explanation. Data processing systems useful according to various embodiments of the present invention may include additional servers, routers, other devices, and peer-to-peer architectures, not shown in FIG. 3, as understood by those of skill in the art.

The system includes a client device 102 and corpus data server 104 communicatively coupled to server 106 via a network 108. Client device 102 may comprise computing devices (e.g., desktop computers, terminals, laptops, personal digital assistants (PDA), cellular phones, smartphones, tablet computers, or any computing device having a central processing unit and memory unit capable of connecting to a network). Client devices may also comprise a graphical user interface (GUI) or a browser application provided on a display (e.g., monitor screen, LCD or LED display, projector, etc.). A client device may include or execute a variety of operating systems, such as personal computer operating systems (e.g., Windows, Mac OS or Linux, etc.), mobile operating systems (e.g., iOS, Android, or Windows Mobile, etc.), or the like. A client device may include or may execute a variety of possible applications, such as a client software application enabling communication with other devices, such as communicating one or more messages, such as via email, short message service (SMS), or multimedia message service (MIMS).

The system further includes automated computing machinery comprising the server 106 useful in natural language processing according to embodiments of the present invention. The server includes at least one computer processor or "CPU" as well as random access memory ("RAM") which is connected through a high-speed memory bus and bus adapter to processor and to other components of the server. Stored in RAM, or a hard drive connected to the RAM, may be a content analyzer 114 including computer program instructions that, when executed, cause the computer to perform natural language processing according to embodiments of the present invention by extracting specific topics of information from unstructured text into logical segments.

The content analyzer 114 may comprise an artificial intelligence unit trained by model trainer 112 (e.g., using machine learning techniques such as neural networks) to identify text of unstructured data belonging to certain logical segment classifications. Training data may be received from various entities in various ways, including, for example, from a user through a graphical user interface ("GUI") presented on the display of the client device 102 and/or from corpus data server 104 for the purpose of gathering and compiling training data. Unstructured data may be provided from user input 110. The unstructured data may include a data structure that includes a description of terms or a combination of terms, acronyms, numbers, codes, or phrases, and so on. The elements of the unstructured data may be compared to criteria to determine if the elements meet a logical segment classification. Logical segments may represent, for example, topics, topic types, target audiences, degrees of importance, etc.

Corpus data server 104 may comprise a computing device operable to provide a source of both structured and unstructured data from, for example, files, documents, tables, charts, illustrations, photographs, etc. According to one embodiment, client device 102 may provide unstructured data to user input 110 based on data retrieved from corpus data server 104. The content analyzer 114 can be configured to receive the unstructured data from user input 110 to process. The unstructured data may comprise text including elements against which criteria of logical segment classifications may be measured or otherwise compared. The text may fulfill criteria to meet in order to qualify as text that relates to various logical segments. The unstructured data from the user input 110 may be partitioned or divided into logical segments by the content analyzer 114 and sorted into records corresponding to the logical segments in database 118. Linker 116 is operable to add or map the logically segmented data to corresponding documents or file in database 118.

Stored in RAM also is an operating system. Operating systems useful for natural language processing according to embodiments of the present invention include UNIX™ Linux™ Microsoft Windows™ AIX™ IBM's i5/OS™ and others as will occur to those of skill in the art. Non-volatile computer memory also may be implemented for such as an optical disk drive, electrically erasable programmable read-only memory (so-called 'EEPROM' or 'Flash' memory), RAM drives, and so on, as will occur to those of skill in the art.

Network 108 may be any suitable type of network allowing transport of data communications across thereof. Network 108 may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. The network 108 may couple devices so that communications may be exchanged, such as between servers and client devices or other types of devices, including between wireless devices coupled via a wireless network, for example. A network may also include mass storage, such as network attached storage (NAS), a storage area network (SAN), cloud computing and storage, or other forms of computer or machine readable media, for example. In one embodiment, the network may be the Internet, following known Internet protocols for data communication, or any other communication network, e.g., any local area network (LAN) or wide area network (WAN) connection, cellular network, wire-line type connections, wireless type connections, or any combination thereof. Communications and content stored and/or transmitted to and from client devices and servers may be encrypted using, for example, the Advanced Encryption Standard (AES) with a 128, 192, or 256-bit key size, or any other encryption standard known in the art.

Figure 4:
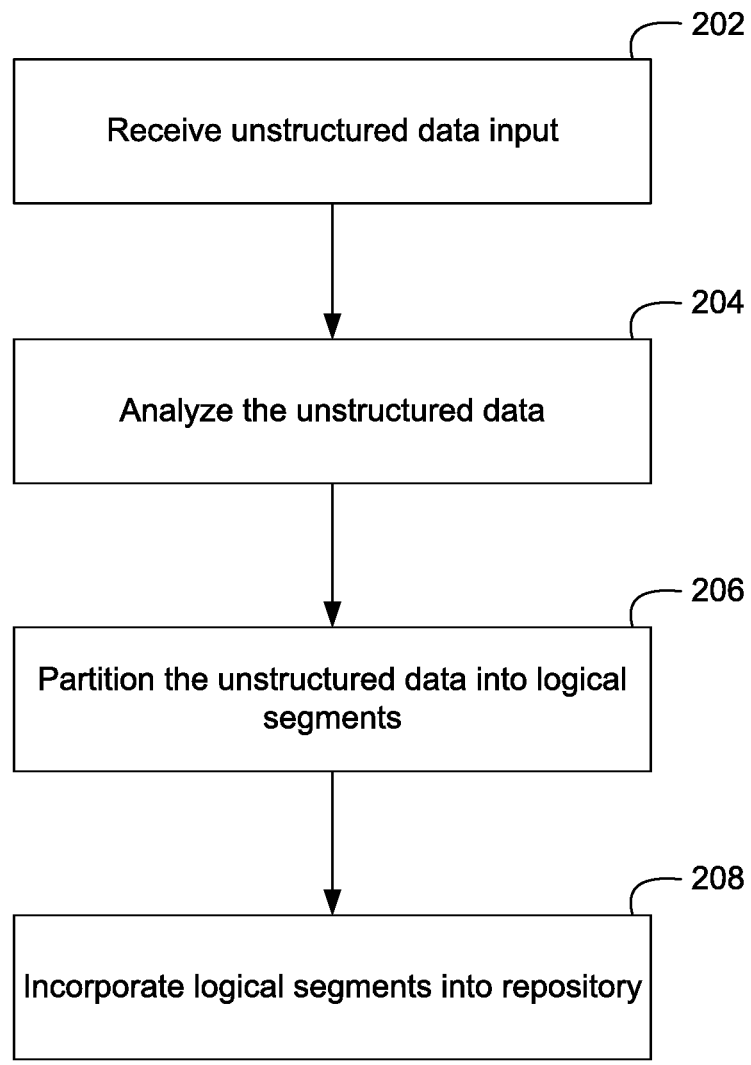
FIG. 4 depicts an exemplary method for processing unstructured data according to one embodiment of the present invention.

FIG. 4 depicts an exemplary method for processing unstructured data according to one embodiment of the present invention. Unstructured data input is received from a user of a client device, step 202. The unstructured data may comprise text or characters including a variety of topics or content. The unstructured data is analyzed, step 204. In particular, the unstructured data may be parsed for specific features within a body of information. The specific features may be selected from a library of criteria for the specific features (to be placed into logical segments). The specified criteria may define how the unstructured data may be divided into logical segments. NLP may be used to analyze the unstructured data input to identify text that may satisfy the criteria.

For example, unstructured data may include large bodies of text such as compliance obligations including laws, regulations, contractual commitments, organizational and industry standards, codes or practice, ethical codes of conduct, good governance guidelines, and agreements with community groups or non-governmental organizations. These compliance obligations may typically comprise several sections and guidance. When an obligation applies to an organization, a subset of the text may apply to a first business line (e.g., risk assessment) of the organization while a second subset may apply to another business line (e.g., compliance). A user may specify obligations as features that are relevant to certain industries or companies. The user may also specify features that are more important than others, or present a certain degree of priority or risk.

The unstructured data is partitioned into logical segments, step 206. Text from the unstructured data can be partitioned or identified as belonging to one or more logical segments based on satisfaction of one or more specified criteria. Referring to the previous example, a compliance obligation may be analyzed and divided into a set of sections based on relevancy to a line of business (e.g., either risk assessment or compliance). For each logical segment, the method may identify at least one business line for which the requirements set forth in the section must be complied.

Logical segments are incorporated into a repository, step 208. The logical segments of text from the unstructured data may be applied to existing data and files in the repository. For example, the logical segments of text from the unstructured data may be linked to the data and files in the repository. Alternatively, the logical segments of text from the unstructured data may be used to create new files, documents, records, or data entries in the repository. The data and files in the repository may be associated with functions, such as, for granular policy execution and guidance linking. Again, referring to the previous example, the logical segments may be assigned to applicable business lines. In another embodiment, a set of obligations can be linked to the logical segments, and the business line may be consequently assigned to the obligations that are linked to the logical segments.

Figure 5:
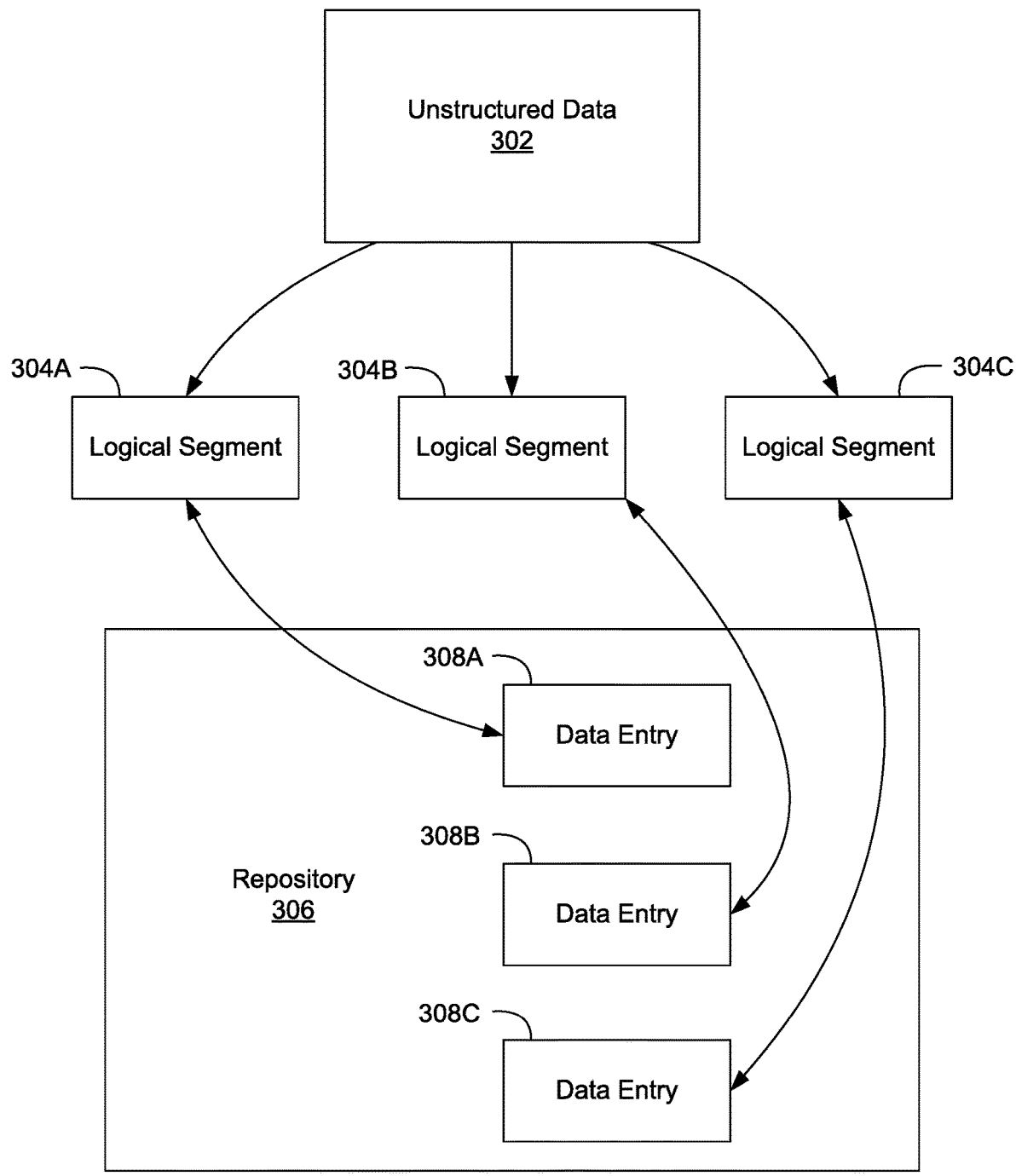
FIG. 5 depicts an exemplary diagram of incorporating logical segments into a repository according to one embodiment of the present invention.

FIG. 5 presents an exemplary diagram of incorporating logical segments into a repository according to one embodiment of the present invention. Unstructured data 302 may be logically partitioned or identified into logical segments 304A, 304B, 304C using, for example, NLP and machine learning. Alternatively, logical segments 304A, 304B, and 304C may be created to include particular sections of data or text from unstructured data 302. Logical segments 304A-304C may comprise pointers, references, linked lists, data structures, or any combination thereof.

Repository 306 includes data entry 308A, 308B, and 308C. The logical segments 304A-304C may be associated with the data entries in repository 306. As illustrated, logical segments 304A-304C are respectively mapped or referenced to data entries 308A-308C. Accordingly, when a given data entry is retrieved or accessed, it may include a reference to the logical segments. Such associations may be either temporary or permanent.

Figure 6:
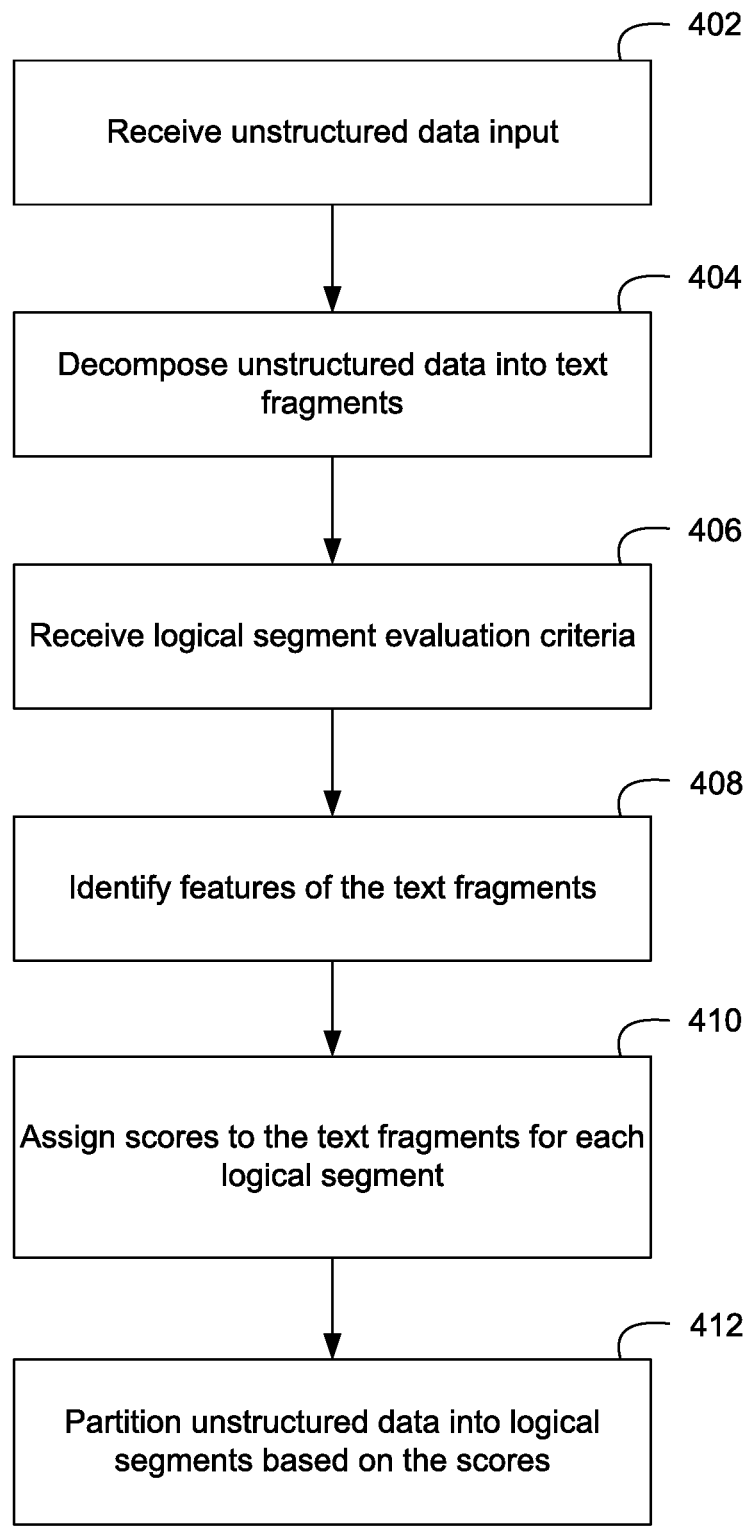
FIG. 6 depicts an exemplary method for natural language processing according to an embodiment of the present invention.

FIG. 6 presents an exemplary method for natural language processing according to an embodiment of the present invention. Unstructured data input is received, step 402. The unstructured data may include text entered via user input. The unstructured data is decomposed into text fragments, step 404. The text may be decomposed into text fragments by grouping text segments based on logical operators, formatting codes (e.g., paragraph markers, font styles, indentions, tabs and the like), as well as the use of punctuation (e.g., periods, commas, hyphens, semicolons, colons, and the like). Such formatting and punctuation often indicates structure to the text fragments.

Logical segment evaluation criteria are received, step 406. The unstructured data may be compared to criteria to determine if the elements meet a logical segment classification. Logical segments may represent, for example, topics, topic types, target audiences, degrees of importance, etc. The logical segment evaluation criteria may define how the unstructured data may be divided into the logical segments. Features of the text fragments are identified, step 408. Each text fragment may be analyzed to identify features within the text fragment. NLP may be used to determine text fragment that may satisfy the criteria.

Scores are assigned to the text fragments for each logical segment, step 410. The text fragments may be assigned scores based on an evaluation of the text fragments in accordance to the logical segment evaluation criteria. The scores may comprise a value that indicates a degree to which a classification of the text matches a logical segment. In such an embodiment, the score may be calculated by first evaluating the veracity of text fragments coupled by logical operators and averaging these values along with the values of text fragment evaluations.

The logical segment evaluation criteria, in some embodiments, may specify values to assign in light of certain features of the text fragments. For example, the logical segment classifications may suggest that a section is related to taxes and the criteria may require that the paragraphs relates to taxes. In this case, logical segment criteria may specify a value of 1 (or 100%) that can be assigned to the evaluation of that criteria. In other embodiments, scores for text fragments may be determined based on whether the text fragments are true in light of logical operators. For example, a text fragment that may satisfy two criteria "taxes" and "compliance" and in which the logical operator is an "and" operator, it may be determined that each criteria is true, assigning a value of '1' to each criteria.

The unstructured data is partitioned into logical segments based on the scores, step 412. Certain sections of the unstructured data, such as, the text fragments may be placed into the logical segments in accordance to the scores associated with the logical segment evaluation criteria.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIGS. 1 through 6 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for natural language processing (NLP), the computer system comprising a computer processor, a computer memory operatively coupled to the computer processor and the computer memory having disposed within it computer program instructions that, when executed by the computer processor, cause the computer system to carry out the steps of:
   receiving unstructured data from a user input;
   decomposing the unstructured data into text fragments;
   receiving logical segment evaluation criteria from the user input;
   identifying features of the text fragments; and
   assigning a score to the text fragments for one or more logical segments.

2. The computer system of claim 1 wherein decomposing the unstructured data into text fragments further comprises the computer processor grouping text fragments based on logical operators, formatting codes, and punctuation.

3. The computer system of claim 1 further comprising the computer processor comparing the unstructured data to the logical segment evaluation criteria.

4. The computer system of claim 1 wherein the logical segment evaluation criteria define how the unstructured data is divided into logical segments.

5. The computer system of claim 4 wherein the one or more logical segments represent topics, topic types, target audiences, and degrees of importance.

6. The computer system of claim 1 wherein identifying features of the text fragments further comprises the computer processor using NLP to determine that the text fragments satisfy the logical segment evaluation criteria.

7. The computer system of claim 1 wherein assigning the score to the text fragments further comprises the computer processor evaluating the text fragments in accordance to the logical segment evaluation criteria.

8. The computer system of claim 1 wherein the score comprises a value that indicates a degree to which the text fragments matches a logical segment based on the logical segment evaluation criteria.

* * * * *